Dec. 1, 1970   R. DOWBENKO ET AL   3,544,489
NON-PIGMENTED, OPAQUE, MICROPOROUS FILM AND PROCESS
AND COMPOSITION FOR PREPARING SAME
Filed June 14, 1966

INVENTOR
ROSTYSLAW DOWBENKO
BRUCE N. McBANE

BY

ATTORNEYS 3,544,489
NON-PIGMENTED, OPAQUE, MICROPOROUS
FILM AND PROCESS AND COMPOSITION
FOR PREPARING SAME
Rostyslaw Dowbenko and Bruce N. McBane, Gibsonia,
Pa., assignors to PPG Industries, Inc., a corporation of
Pennsylvania
Filed June 14, 1966, Ser. No. 557,578
Int. Cl. C08d 13/12; C08j 1/28
U.S. Cl. 260—2.5          27 Claims

ABSTRACT OF THE DISCLOSURE

Highly opaque films which are opaque without the use of opacifying pigments, may be formed by applying to a substrate a composition comprising (a) a thermosetting resin and (b) a solvent extractable thermoplastic resin, which resins are at least partially compatible and subsequently curing the thermosetting resin such as by heating. Upon curing of the thermosetting resin, the thermoplastic resin forms minute discrete particles in the thermoset resin matrix. The thermoplastic resin is then extracted from the film such as by using a suitable solvent for the thermoplastic resin. Upon removal of the minute particles of thermoplastic resin from the thermoset resin matrix there results a film which is continuous, opaque, and contains a large number of voids.

---

This invention relates to films which are opaque and microporous but which do not contain pigments conventionally used in the preparation of opaque films. Another aspect of this invention relates to a composition which is useful in preparing such a film.

Opaque films are conventionally prepared by adding a pigment which acts as an opacifying agent to a solution of a film-forming material which would otherwise be colorless or transparent when cast in a film. The necessity for adding an opacifying agent obviously increases the cost of the resultant film. Moreover, such films have no more porosity than the non-pigmented film.

Optical opacity, for example hiding in a paint film, is achieved either by absorption or scattering of the incident light, or by a combination of these two. Thus, black is opaque because it absorbs the light incident on it and white is opaque because it backscatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wavelength of light. Scattering depends on the relative refractive indices of pigment and vehicle as well as on the particle size of the pigment relative to the wavelength of incident light.

One simple description of the relation of the scattering and absorption to the resulting reflectance is that of Kubelka and Munk. At complete hiding, the following equation applies:

$$\frac{(1-R_\infty)^2}{2R_\infty} = \frac{K}{S} \quad \text{(Equation 1)}$$

where $R_\infty$ is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R_\infty)^2}{2R_\infty} = \frac{C_1K_1+C_2K_2+C_3K_3+\ldots}{C_1S_1+C_2S_2+C_3S_3+\ldots} \quad \text{(Equation 2)}$$

where $C_1$, $C_2$ and $C_3$ refer to the concentrations of pigments 1, 2, 3, etc.

When hiding is incomplete, the following equation applies:

$$R = \frac{1-Rg(a-bctghbSX)}{a-Rg+bctghbSX} \quad \text{(Equation 3)}$$

where R is the resulting internal reflectance, Rg is the reflectance of the substrate, $a$ is equal to $(S+K)/S$, $b=(a^2-1)^{1/2}$, S is the scattering coefficient, X is the thickness of the film in mils, and ctgh refers to hyperbolic cotangent.

The Kubelka-Munk scattering coefficient may be computed from the following equation:

$$SX = \frac{1}{b}\text{Arctgh}\frac{1-aRo}{bRo} \quad \text{(Equation 4)}$$

where Arctgh refers to the inverse hyperbolic cotangent, Ro is the reflectance over a black substrate of 0% reflectance, $a$ may be found from the relation, $$a = \frac{1}{2}[R + \frac{Ro-R+Rg}{RoRg}$$

and $b$ is determined as above. In this equation, R equals reflectance over a white substrate and Rg is reflectance of the substrate which is coated; or $a$ may be found from the following equation:

$$a = \frac{1}{2}\left[\frac{1}{R_\infty} + R_\infty\right]$$

K may be found from the equation $K = S(a-1)$.

The Kubelka-Munk analysis is discussed in further detail by D. B. Judd in "Color in Business, Science and Industry," John Wiley and Sons, New York, 1952, pp. 314–338; and by D. B. Judd and G. Wyszecki in "Color in Business, Science, and Industry," 2nd ed., John Wiley and Sons, New York, 1963, pp. 387–413, the disclosures of which are incorporated herein by reference.

Various processes have been described in the art for preparing opaque films which do not rely on pigmentation for opacity. One such process involves casting a film of a thermoplastic material onto a substrate and thereafter treating the film with a fluid which will etch the film and cause it to diffuse light. Such a process results in films which are not permanently opaque—i.e., heat and/or pressure will render them transparent or translucent.

Some processes for preparing opaque films rely for opacity upon the presence of a large number of voids in the film. Such films may be prepared by depositing a film from an emulsion, i.e., either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film-forming material and entrapment of the dispersed water droplets. The water is then evaporated leaving microscopic voids throughout the film structure.

When an oil-in-water emulsion is used, the mechanism for forming the film is similar to that described above. A film-forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid.

This liquid is then evaporated to cause minute voids in the film structure.

Another technique for obtaining porous, opaque non-pigmented films is by preparing an aqueous dispersion of a film-forming polymer containing a water-soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

However, the use of emulsions presents certain problems, by virtue of the very nature of an emulsion. For example, in handling an emulsion, care must be taken in order to insure its stability—i.e., so that it will not break before it is used to deposit a film. This frequently requires the use of emulsifying agents. However, emulsifying agents which are then present in the film detract from the physical properties of the film such as its water repellency, scrub resistance, etc. Furthermore, only film-forming materials which are capable of being readily emulsified may be employed in such a system. Moreover, when films are formed from emulsions, the size of the voids present in the film are dependent upon the size of the droplets in the emulsion which are entrapped in the film. This places a definite limitation upon the smallness of the voids which are obtained in the film.

It is an object of this invention to provide microporous, opaque, non-pigmented films of a thermoset resin.

It is another object of this invention to provide such films which will retain their opacity even when subjected to conditions of heat and/or pressure.

Another object of this invention is to provide a topcoat sealer for such films.

It is still another object of this invention to provide a process for preparing such films which does not rely upon the use of emulsions.

It is a further object of this invention to provide a coating composition for use in preparing such films.

These and other objects are achieved by the practice of this invention which, briefly, comprises producing a continuous, opaque film containing voids by applying as a film to a substrate a composition comprising (a) a thermosetting resin and (b) a solvent-extractable thermoplastic resin, which resins are at least partially compatible, and subsequently curing the thermosetting resin, such as by heating. Upon curing of the thermosetting resin, the thermoplastic resin forms minute, discrete particles in the thermoset resin matrix. The thermoplastic resin is then extracted from the film such as by means of a suitable solvent for the thermoplastic. There is thus obtained an opaque film of the thermoset resin. The film is continuous and contains a large number of voids.

The thermosetting resins which may be used in the practice of this invention are well known in the art. Such resins are curable to a cross linked thermoset condition by the use of either heat and/or a curing catalyst.

One preferred group of thermosetting resins which may be used in the practice of this invention are admixtures of interpolymers of hydroxyl esters of ethylenically unsaturated acids with at least one other polymerizable ethylenically unsaturated monomer and a cross linking agent therefor such as an aminoplast resin. Interpolymers of hydroxyl esters of unsaturated acids with at least one other polymerizable ethylenically unsaturated monomer are prepared by interpolymerizing a mixture of monomers comprising at least 2 percent by weight of a hydroxyalkyl ester of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well known in the art, using conventional procedures utilizing catalysts well known in the art. Free radical producing catalysts are commonly used but catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate, and hydroxypropyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl) maleate, bis(hydroxypropyl) fumarate, and similar bis(hydroxyalkyl) esters, as well as mixed alkyl hydroxyalkyl esters, such as butyl hydroxyethyl maleate and benzyl hydroxypropyl maleate. Monoesters such as mono(hydroxyethyl and mono(hydroxypropyl) esters of maleic acid and similar acids can also be used.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, 1,3-butadiene, 2-chlorobutene, alpha-methylstyrene, alpha-chlorostyrene, 2-chloro-1,3-butadiene, 1,1-dichloroethylene, vinyl butyrate, vinyl acetate, allyl chloride, dimethyl maleate, divinylbenzene, diallyl itaconate, triallyl cyanurate, and the like.

The most useful interpolymers of this type are produced from the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylates, as well as similar esters having up to about 20 carbon atoms in the alkyl group. Among the vinyl aromatic hydrocarbons generally utilized are styrene and alpha-alkylstyrene or vinyltoluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

Examples of catalysts ordinarily used in the interpolymerization include peroxygen compounds such as benzoyl peroxide, cumene hydroperoxide, hydrogen peroxide, and t-butylperoxy isopropyl carbonate, and azo compounds such as alpha,alpha-azobis(isobutyronitrile) and p-methoxyphenyl diazothio(2-naphthyl) ether.

Cross linking agents for interpolymers of hydroxyalkyl esters are materials which contain functional groups reactive with the hydroxyl groups of the interpolymer. Examples of such coreactive materials include polyisocyanates, such as toluene diisocyanate and isocyanatocontaining polymeric products; aminoplast resins, such as hexa(methoxymethyl)melamine and others described hereinafter; epoxy resins, such as polyglycidyl ethers of bisphenol A; and others, e.g. silicone resins.

Another preferred group of thermosetting resins which may be used in the practice of this invention are admixtures of alkyd resins and cross linking agents therefor such as aminoplast resins. Alkyd resins are obtained by the condensation of a polyhydric alcohol and a polycarboxylic acid.

In forming the alkyd resin which can be used in admixture with an aminoplast resin, various polyols can be used. These include glycerol, pentaerythritol, dipentaerythritol, mannitol, sorbitol, trimethylolethane, trimethylolpropane, 1,3,6-hexanetriol, and others. These are usually employed in amounts approximating, or somewhat exceeding equivalency with respect to the acid component.

Usually the acid component comprises a mixture of dibasic and monobasic acids. The dibasic acids are represented by such dicarboxylic acids as phthalic acid, isophthalic acid, terephthalic acid, tetrachlorophthalic acid, tetrabromophthalic acid, carbic acid (i.e., the reaction product of maleic acid and cyclopentadiene), chlorendic acid, fumaric acid, maleic acid, itaconic acid, adipic acid and sebacic acid, or combinations of these acids. The term "acid" also includes the anhydrides thereof where they exist.

It is preferable to include a substantial amount of a monocarboxylic acid in the alkyd resin. Appropriate monocarboxylic acids comprise saturated aliphatic acids containing about 8 to about 18 carbon atoms, such as lauric acid, palmitic acid, stearic acid, hydroxystearic acid; unsaturated acids such as oleic acid and ricinoleic acid, pelargonic acid, decanoic acid, myristic acid, cyclohexylcarboxylic acid, 2-ethylhexoic acid, acrylic acid, methacrylic acid, abietic acid; aromatic acids such as benzoic acid, p-tertiarybutylbenzoic acid, toluic acid, and others. Usually the two types of acids (dicarboxylic acid and monocarboxylic acid) are employed in about equimolar amounts, but these ratios can be varied if desired. Monocarboxylic acids low in or free of functional unsaturation, such as ethylenic groups, are presently preferred. The use of such acids results in the production of non-oxidizing oil modified alkyds. Pure acids or mixtures of two or more thereof with each other may be employed. Such mixtures of monobasic acids as are obtained from natural sources, such as glycerides represented by coconut oil, soya oil, corn oil, cotton seed oil, are examples of useful mixtures of useful acids. Acids distilled from tall oil may be employed.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids, but may be employed as partial esters of a polyol such as glycerol, pentaerythritol, or other polyhydric alcohol. Such partial esters will average about 2 available hydroxyl groups per molecule and they are reacted by esterification with a dicarboxylic acid such as herein disclosed to provide an alkyd resin.

The sums of the acids usually are employed in slightly less (e.g. 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

Further details for the preparation of alkyd resins are described in the book entitled "Organic Coating Technology," Vol. I, by Henry F. Payne, published by John Wiley & Sons (1954), chapter 7.

Cross linking agents for the alkyd resins include those materials which contain functional groups reactive with the hydroxyl groups of the alkyd, examples of which have been previously described in relation to cross linking agents for interpolymers of hydroxy alkyl esters. The preferred cross linking agents are aminoplast resins which will be more fully described hereinafter. Various proportions of alkyd resin and aminoplast resin cross linking agent may be employed as the thermosetting resin component of this invention. For example, the aminoplast resin may constitute from about 5 to about 50 percent by weight of the mixture of the two resins, although this ratio is not critical. The blend of the alkyd resin and the aminoplast resin may also include various added vehicular agents such as plasticizers represented by epoxidized oils, so-called chemical plasticizers such as triphenyl phosphate, tricresyl phosphate, dicyclohexyl phthalate, butylbenzyl phthalate, and others.

Aminoplast resins which are the preferred cross linking agents for interpolymers of hydroxyl esters of unsaturated acids and for alkyd resins are derived from the reaction of a compound containing a plurality of —NH₂ groups (e.g., urea, melamine, acetoguanamine or benzoguanamine) with an aldehyde or a substrate acting as an aldehyde (e.g., formaldehyde). In preparing aminoplasts, the aldehyde or its equivalent is usually dissolved in an alkanol, such as butyl alcohol, and at least a part of the N-methylol groups on the aminoplast are converted into

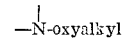

groups as represented by the formula:

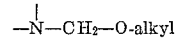

These groups are distributed as side chains in the resin molecules. Butanol may be replaced by other monohydric aliphatic alcohols containing from about 1 to about 8 carbon atoms and being represented by methyl alcohol, ethyl alcohol, propyl alcohol, isopropyl alcohol, butyl alcohol, isobutyl alcohol, pentyl alcohol, hexyl alcohol and octyl alcohol. All of these are primary or secondary alcohols. Such resins contain

groups and

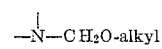

groups, wherein the moiety designated as "alkyl" ordinarily contains from 3 to 8 carbon atoms. It is preferred that the alkyl groups be butyl—i.e., that the curing agent be a butylated aminoplast.

Further information as to the preparation and characteristics of aminoplast resins are contained in the aforementioned book entitled "Organic Coating Technology," chapter 8, pp. 326–350.

Thermosetting resin compositions comprising mixtures of an interpolymer of a hydroxyalkyl ester and an aminoplast resin are further described in U.S. Pat. No. 2,681,897; and further details for the preparation of aminoplast resins and alkyd resins which may be employed are described in U.S. Pat. No. 3,113,117.

Another group of thermosetting resins which may be used are carboxylic acid amide interpolymers of the type disclosed in U.S. Pat. Nos. 3,037,963 and 3,118,853. These interpolymers are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol. The exact mechanism whereby the amide interpolymers are obtained is not definitely known, but is believed to begin by the formation initially of a relatively short chain soluble interpolymer having an approximate structure as follows, acrylamide being utilized for illustrative purposes:

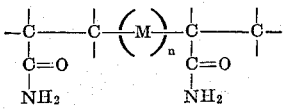

wherein M represents a unit of a monomer polymerizable with acrylamide, and $n$ represents a whole number greater than 1. For example, if styrene were utilized as the second monomer, M would represent the unit:

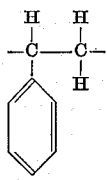

The short chain interpolymer then reacts with an aldehyde, as represented by formaldehyde, to give the structure

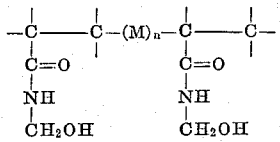

wherein M and $n$ have the significance set forth hereinabove.

In the event the aldehyde is utilized in the form of a solution in butanol or other alkanol, etherification will take place so that at least some of the methylol groups in the above structure will be converted to groups of the structure $$-ROR_1$$

wherein R is a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol such as methanol, ethanol, propanol, pentanol, octanol, decanol, and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and amide derivatives such as N-carbamyl-maleimide may also be utilized.

Any polymerizable monomeric compound containing at least one $CH_2=C<$ group may be polymerized with the unsaturated carboxylic acid amide. Examples of such monomers include styrene, isobutylene, vinyl chloride, vinylidene chloride, vinyl acetate, methyl methacrylate, ethyl acrylate, alkyl alcohol, acrylonitrile, methacrylic acid, etc.

The preparation of the amide interpolymer is described in detail in U.S. Pats. 2,870,116 and 2,870,117.

The amide interpolymer resin prepared according to the disclosures in the above-identified patents is reacted with an aldehyde, preferably in the presence of an alcohol. Formaldehyde, in solution in water (Formalin) or in an alkanol such as butanol, or a formaldehyde-yielding substance such as paraformaldehyde, trioxymethylene, or hexamethylenetetraamine is greatly preferred. However, other aldehydes including acetaldehyde, butyraldehyde, furfural, and the like, preferably containing only atoms of carbon, hydrogen and oxygen can be used. Dialdehydes such as glyoxal are preferably not employed, since they tend to cause the amide interpolymer resin to gel.

The interpolymer will contain in the polymer chain recurrent groups of the structure

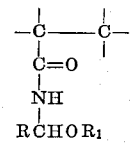

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction. These resins upon subsequent baking produce highly cross-linked structures, such cross linking sites including functional groups in other polymers present in the system where applicable.

Aldehyde-modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl substituted amides is described in U.S. Pat. No. 3,079,434.

Other thermosetting resin compositions which may be used in conjunction with a solvent extractible thermoplastic resin which is at least partially compatible therewith and which will form minute discrete particles in the thermoset resin matrix when the thermosetting resin composition is cured include ethylenically unsaturated polyester resins obtained by the condensation of a glycol, such as ethylene glycol, propylene glycol, etc., and a polycarboxylic acid, such as maleic acid, fumaric acid, etc., in combination with a vinylidene monomer such as styrene, vinyl toluene, etc.; and epoxy resins such as obtained by the combination of bis-phenol and epichlorohydrin (e.g., Epon resins) in combination with a curing catalyst such as a polyamine (e.g., ethylene diamine).

Mixtures of two or more thermosetting resins may also be employed.

The thermoplastic resins which may be employed in the practice of this invention are well known in the art. The only limitation on the selection of thermoplastic resin to be used in a particular system is that it must be at least partially compatible with the particular thermosetting resin with which it is used before the thermosetting resin is cured; it must form minute, discrete particles in the thermoset resin matrix upon curing of the thermosetting resin composition; and it must be solvent-extractible.

For the purpose of this invention, resins are considered to be at least partially compatible when they are capable of being admixed to form a homogeneous composition which does not readily separate into distinct phases of its component parts.

Examples of thermoplastic resins which may be used include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polyolefins (e.g., polyethylene and polypropylene); nylon; polycarbonates; polystyrene; copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

A preferred group of thermoplastic polymers are copolymers of acrylates, such as 2-ethylhexyl acrylate and/or methacrylates, such as methyl methacrylate, with up to 50% of a comonomer such as dibutyl maleate or fumarate, butyl glycidyl maleate or fumarate and glycidyl methacrylate. These thermoplastic polymers may be dissolved in a solvent such as benzene, toluene, butanol, acetone or xylene when they are admixed with the thermosetting resin compositions.

Graft copolymers or block copolymers may also be used as the thermoplastic resin. Such copolymers possess segmetal periodicity—i.e., they contain continuous sequences of one monomer that are not governed by statistical distribtuion. They may be formed by methods known in the art such as by polymerizing a vinylidene monomer in the presence of an appropriate preformed polymer and catalyst. Specific details for the preparation of graft copolymers are described, for example, in U.S. Pat. No. 3,232,903. The preformed polymer may be, for example, a polymeric ester of acrylic acid or methacrylic acid such as a copolymer of an ester of methacrylic acid or acrylic acid formed with an alcohol having 4 to 18 carbon atoms or of mixtures of such esters with esters of methacrylic acid or acrylic acid formed with alcohols having 1 to 5 carbon atoms. Mixtures of methacrylate and acrylate esters with from 1% to 50% by weight of monoethylenically unsaturated monomers such as maleic anhydride, acrylic acid, methacrylic acid, vinyl pyrrolidone, N-dimethylaminoethyl acrylate or methacrylate, N,N-dimethylaminoethylacrylamide or methacrylamide, dimethylaminoethyl vinyl ether, dimethylaminoethyl vinyl sulfide, ureidoalkyl vinyl ether or sulfide such as ureidoethyl vinyl ether or sulfide, vinyl chloride, vinylidene chloride, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether and vinyl isobutyl ether may also be used in the preparation of the preformed polymer.

Vinylidene monomers which may be polymerized in the presence of the preformed polymer include vinyl esters of fatty acids having from 1 to 18 carbon atoms such as vinyl acetate, vinyl propionate, vinyl butyrate, vinyl laurate, vinyl oleate and vinyl stearate; esters of acrylic acid or methacrylic acid with alcohols having from 1 to 18 carbon atoms such as methyl acrylate, methyl methacrylate, ethyl acrylate, ethyl methacrylate, propyl acrylate, propyl methacrylate, isopropyl acrylate, isopropyl methacrylate, butylacrylate, butyl methacrylate, cyclohexyl acrylate, cyclohexyl methacrylate, etc.; acrylonitrile, methacrylonitrile, acrylamide, methacrylamide, styrene, α-methylstyrene, vinyl toluene, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate; hydroxyalkyl acrylates or methacrylates such as β-hydroxyethyl methacrylate, β-hydroxyethyl vinyl ether, β-hyhydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene.

Mixtures of two or more thermoplastic resins may also be used in this invention. Thus, for example, when a graft copolymer is prepared as described above by polymerizing a vinylidene monomer in the presence of an appropriate prepolymer, there is generally obtained a mixture of a graft copolymer comprising grafts of the vinylidene monomer on the prepolymer, and a homopolymer of the vinylidene monomer (or a copolymer if two or more different vinylidene monomers are employed). This mixture of polymers may be used as such in the practice of this invention or it may be separated into its component parts and either the graft copolymer or homopolymer used alone.

The proportions of thermosetting resin and thermoplastic resin which are admixed are not critical and will vary depending on the particular resins used and on the properties desired in the resultant films—e.g., amount of opacity and/or porosity. Generally, from about 10 to 200 parts by weight of the thermoplastic resin is employed for every 100 parts by weight of thermosetting resin used.

The thermosetting resin and the thermoplastic resin may be admixed by forming a homogeneous solution or dispersion of the resins in a liquid medium. Solvents which are suitable for use with interpolymers of hydroxyl esters of unsaturated acids and an aminoplast resin include xylene, benzene, toluene, amyl acetate, butyl, acetate, butyl propionate, dibutyl phthalate, diethyl phthalate, ethylene glycol, diethyl ether, ethyl phenyl ether, diphenyl ether, butyl benzyl ether, etc. When the thermosetting resin composition comprises an alkyd resin and an aminoplast resin, suitable solvents include alcohols containing from about 3 to 8 carbon atoms such as propyl alcohol, isopropyl alcohol, butyl alcohol, amyl alchol, nonyl alcohol, octyl alcohol, etc.; aromatic hydrocarbons such as xylene or toluene; ketones such as methyl ethyl ketone, methyl isobutyl ketone, cyclohexanone, isophorone, etc.; esters such as isopropyl acetate, butyl acetate, amyl acetate, nonyl acetate; phosphates such as tributyl phosphate; and chlorinated hydrocarbons such as methylene chloride.

In the preferred embodiment of this invention, both the thermoplastic and the thermosetting resin are in solution. However, under proper conditions, one resin may be in solution and the other may be present in the form of a dispersion; or both resins may be present in the form of a dispersion.

The composition of this invention may also include other ingredients such as plasticizers, etc. If it is desired to obtain a film having a color other than white, colored pigments or dyes maybe included in the composition.

When the thermoplastic and thermosetting resins have been admixed in a liquid vehicle, either in dispersion or solution, the homogeneous mixture is applied to a substrate as a film by techniques well known in the art. Thus, it may be coated onto a substrate by brushing, spraying, dipping, roller coating, knife coating or calendering.

The film may be air dried for a time to remove a portion of the liquid vehicle and it is then cured as by baking to cross link the thermosetting resin. This process results in at least a portion of the thermoplastic resin forming minute, discrete particles in the thermoset resin matrix in the form of globules and/or threads due to its reduced compatibility with the thermoset resin. Some portion of the thermoplastic resin may not separate as discrete particles when the thermosetting resin is cured i.e., it may remain compatible with and be incorporated into the thermoset resin matrix and act as a plasticizer therefor.

The temperature required to effect a cure of the thermosetting resin will depend upon the particular resin employed. For example, when the thermosetting resin component is an admixture of an interpolymer of a hydroxyl ester of an unsaturated acid with at least one other monomer and an aminoplast resin, curing temperatures of from 250° to 350° F. may be used. However, when the thermosetting resin is a carboxylic acid amide interpolymer of the type previously described, higher cure temperatures are required.

After curing, the thermoplastic resin is leached out or extracted from the film by contacting the film with a suitable solvent for the thermoplastic resin such as by immersion. The length of time the coating is contacted with the solvent is not critical so long as it is sufficient to extract the thermoplastic resin. It is preferred that at least about 75% by weight of the thermoplastic resin content present in the matrix be extracted. It is also preferred that the amount of thermoplastic resin which is extracted be at least about 10% by total weight of the film before extraction. Generally, the film is contacted with the solvent for from 1 to 20 minutes and, preferably, for about 2 minutes at room temperature. The film is then dried to remove the residual solvent. There remains an opaque, microporous film of the thermoset resin.

The thermoplastic resin which is extracted from the film may be recovered from the extract thereof by known techniques, such as by evaporation of the solvent, and recycled for re-use in the practice of this invention. The solvent extract may also be recovered for re-use in the process.

Instead of mixing the thermosetting and thermoplastic resins together in a liquid vehicle, a homogeneous mixture of finely divided particles of the two resins may be prepared. This mixture may be applied as a powder coating to a substrate. The mixture of powdered resins is then heated to form a melt of the two resins and to cure the thermosetting resin. The minute, discrete particles of thermoplastic resin which are thereby formed in the thermoset resin matrix are then extracted therefrom as previously described to obtain an opaque, microporous film.

The films produced by the practice of this invention are characterized by the presence therein of a large number of minute, discrete voids and by being of very high reflectivity and a substantially pure white (if no dye or colored pigment has been included). Their extreme whiteness makes them useful as white reflectance standards. The voids in the film may be substantially globular in shape or threadlike (i.e., have substantially greater length than diameter). The average diameter of the voids is less than about 1.0 micron, preferably, less than about 1/20 micron. The lengths of the threadlike voids are generally less than about 3 microns and, preferably, are from about 1 to 2 microns.

The microporous structures of the films of this invention will be more fully described with reference to the accompanying drawings wherein.

These drawings are more fully described as follows.

Figure 1:
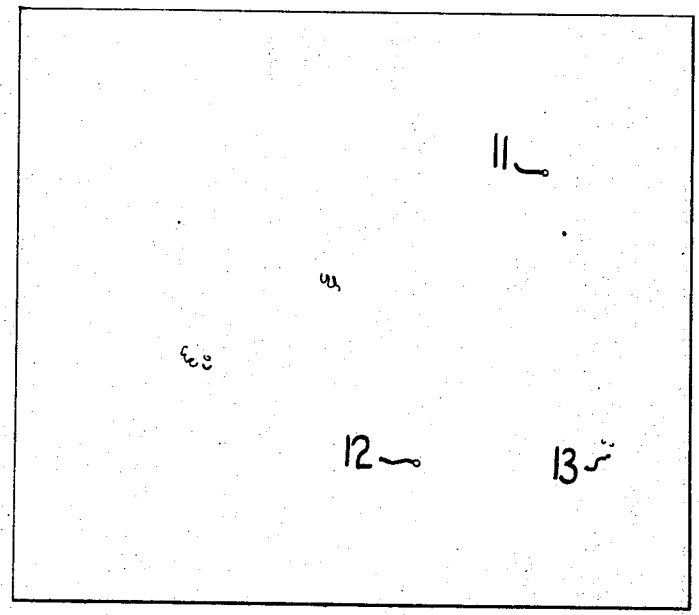
FIG. 1 is a 20,000× magnification of a non-extracted panel.

A steel panel is sprayed with a coating composition of this invention as previously described and the panel is baked to cure the thermosetting resin. FIG. 1, which depicts a magnification of the surface of the film coating the panel, shows that the surface of the film is free of any voids although some air bubbles such as 11, 12 and 13 are present in the film.

Figure 2:
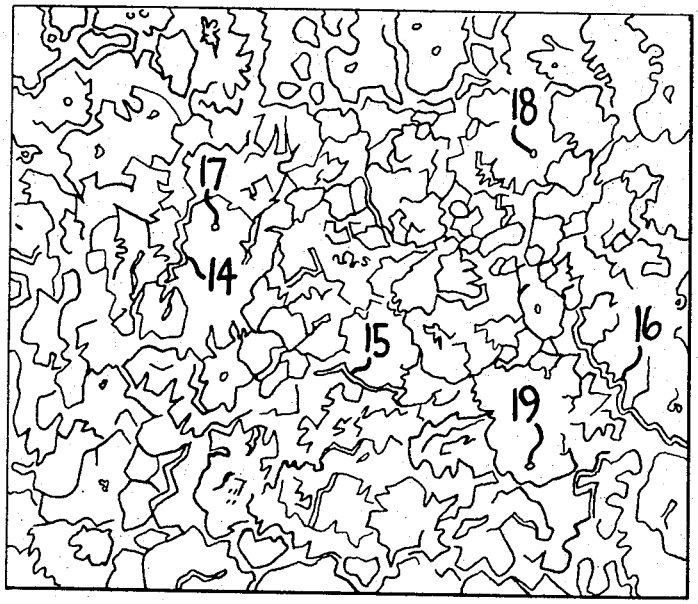
FIG. 2 is a 20,000× magnification of an extracted panel.

The panel is then extracted with a solvent for the thermoplastic resin to provide an opaque, microporous film. FIG. 2, which depicts a magnification of the surface of this film shows that the surface of the film contains a large number of discrete, minute voids. Some of these voids are seen as threadlike lines, such as 14, 15 and 16. The threadlike lines 14, 15 and 16 are cross sections of threadlike voids which are transverse to the surface of the film. Other voids are seen as substantially circular areas, such as 17, 18 and 19. The circular areas 17, 18 and 19 may be either the cross sections of globular voids or of threadlike voids which are perpendicular or oblique to the surface of the film.

The films possess excellent hiding power and may be utilized in automotive finishes, appliance finishes, coatings for lighting fixture reflectors and in similar protective and decorative coatings. Such coatings may have thicknesses ranging up to 10 mils. The coatings are insoluble and infusible and are extremely tough and abrasion resistant. The coatings are especially useful on light fixtures since they almost completely reflect light rather than absorb it.

Since a pigment need not be used in the films of this invention, difficulties associated with the use of pigments, such as grinding or dispersing, settling, agglomeration or flocculation, and chalking and embrittlement of the films upon exposure to weather, are avoided. Moreover, the films of this invention result in great economic savings over conventional coating compositions. Thus, the cost of production of an opaque, non-pigmented film of this invention is 35% to 50% less than the cost for production of a coating of comparable coverage and hiding power containing $TiO_2$ due to the fact that a pigment need not be used.

Films produced in accordance with the practice of this invention possess improved physical properties over films produced in a similar manner but which are not extracted to remove the minute discrete particles of thermoplastic resin from the thermoset resin matrix. The thermoplastic resin acts as a plasticizer when it is present in the thermoset resin matrix. The presence of the thermoplastic resin plasticizer in the film does not affect its properties significantly; but, after extraction of the thermoplastic resin, the resultant opaque, microporous thermoset film has substantially improved flexibility on mandrel bend, better chip resistance, better adhesion to a prime coated substrate, improved humidity resistance and better resistance to blistering and cracking than the unextracted film. Thus, the microphorous structure of the films of this invention materially increase the film strength.

The films of this invention are also more resistant to the collection of dirt, and, therefore, to discoloration, than are pigmented films of the corresponding thermoset resin.

The process of this invention may also be used as a means to determine the degree of cure of a thermosetting resin. The degree of opacity which is achieved by this process for a given composition is a function of the degree of cure of the thermosetting resin component. For example, if a series of panels are each coated with a coating composition as described herein, baked for varying times and/or at varying temperatures, extracted with a suitable solvent for the thermoplastic resin and dried, panels on which the thermosetting resin did not cure will remain translucent; panels on which the thermosetting resin is completely cured will become opaque; and panels on which the thermosetting resin is partially cured will be either translucent or partially opaque, depending upon the degree of cure achieved. In this manner, optimum curing temperatures and times may be determined.

The films of this invention possess the unique characteristic of changing from opaque or white to translucent when contacted with a liquid having sufficient fluidity or wetting powers to fill up the voids in the film. Examples of such liquids include the solvents used to extract the thermoplastic resin from the thermosetting resin matrix. After the liquid evaporates, the film again becomes opaque. Where it is desired to prevent the occurence of this phenomenon—e.g., where there is a possibility that the coated article may come into contact with a solvent such as xylene—a sealer, such as a resinous dispersion (e.g., an aqueous emulsion or a dispersion lacquer) may be applied to the surface of the film. The resin particles in the dispersion must be larger than the size of the micropores in the film so that the resin particles will block but not substantially enter the pores of the film. These resin particles are then coalesced to form a protective coating on top of the white film.

Another technique for sealing the opaque, microporous films of this invention is by temporarily filling the voids, applying a sealer and then recreating the voids. According to this technique, a slowly volatile solvent such as mineral spirits or an aromatic petroleum fraction having a boiling range in the vicinity of 160° C. to 210° C. or, in some instances, water, may be applied to the surface by dip or spray. These solvents penetrate the voids in the film, thereby filling them and rendering the coating temporarily transparent. After excess solvent has been wiped from the surface, the film is top coated with a conventional clear coating composition, such as an admixture of an interpolymer of a hydroxyl ester of an ethylenically unsaturated acid with at least one other polymerizable ethylenically unsaturated monomer and an aminoplast resin of the type previously described. The coating composition is unable to penetrate into the solvent filled pores of the film. Subsequent baking of the clear top coat or use of appropriate air dry periods results in hardening of the sealer top coat and in the solvent evaporating from the pores of the film by diffusing through the top coat sealer. The film is thereby restored to its original microporous, opaque condition. The sealed film is impervious to subsequent contact with solvent and is therefore permanently opaque.

The disclosures of each of the above mentioned U.S. patents and of chapters 7 and 8 of the book entitled "Organic Coatings Technology" are incorporated herein by reference.

The following examples illustrate the best modes contemplated for carrying out this invention. In these examples, all parts are by weight unless otherwise specified.

EXAMPLE 1

A butylated melamine-formaldehyde resin is prepared by admixing 1000 parts of a butyl alcohol solution of formaldehyde (40% formaldehyde) and 705 parts of butanol. The acid number of this charge is adjusted to from 0.25 to 0.29 and there are then added 340 parts of melamine. The charge is heated at between about 210° and 225° F. for 9 hours and there are then added 8 parts of sodium carbonate and 41 parts of butanol. The mixture is then heated to distill butanol. The reaction mixture is diluted with sufficient xylene and butanol to give a solution comprising 50% solids, the solvent comprising a 1:1 mixture of xylene and butanol. The butylated melamine-formaldehyde resin in the solution contains a mole ratio of melamine:formaldehyde:butanol of 1.1:5.5:6.0.

A composition is prepared by mixing 60.0 g. of the above described butylated melamine-formaldehyde resin solution and 70.0 g. of a solution of an acrylic interpolymer obtained by copolymerizing a mixture comprising 30% styrene, 30% 2-ethylhexyl acrylate, 18% methyl methacrylate, 11% butyl methacrylate, 4% hydroxyethyl methacrylate, 4% hydroxypropyl methacrylate and 3% methacrylic acid, ⅓ of the methacrylate acid being previously reacted with ethyleneimine. The solution of the interpolymer comprises 60% solids and 40% of a solvent composed of 15% butanol, 62% toluene and 23% xylene. To the mixture of the two resins there are added 70.0 g. of a solution comprising 50% xylene and 50% of a thermoplastic acrylate copolymer obtained by copolymerizing 10% butyl glycidyl fumarate, 45% 2-ethylhexyl acrylate and 45% methyl methacrylate. The resulting mixture is sprayed onto a steel panel, the panel is air dried for ½ hour and then baked at 325° F. for ½ hour to cure the thermosetting resin composition. A translucent film is thus obtained which is cooled to room temperature then immersed in xylene for 2 minutes to extract the minute, discrete particles of the thermoplastic resin from the thermoset resin matrix. After evaporation of the xylene from the film, an opaque, microporous film is obtained.

EXAMPLE 2

A coating composition prepared as described in Example 1 is diluted with 100 g. of xylene to improve sprayability and is sprayed onto steel panels. These panels are then air dried and baked at 350° F. for 20 minutes to cure the thermosetting resin. The panels are immersed for about 2 minutes in xylene. After drying, opaque, white coatings are obtained. The coatings become translucent again on wetting wtih xylene but return to opaque as soon as the xylene is evaporated. When the extraction is repeated using a xylene solution containing an orange dye as the extractant solvent and the panel is immersed in the xylene for 20 minutes and then dried, an opaque, yellow coating is obtained. If blue dye is substituted for the orange dye, an opaque, blue coating is obtained.

EXAMPLE 3

A butylated urea-formaldehyde resin is prepared by first forming a reaction mixture, comprising 1 mole of urea and 2.22 moles of formaldehyde as a 40 percent solution in butanol. This solution comprises about 50 percent of reactants considered as solids in the butyl alcohol. The mixture is refluxed at a pH of 8.5 for about 1 hour. The solution is then acidified to a pH in a range of about 3.5 to 4 and refluxing is further continued until a temperature of 229° F. is reached. Subsequently, butanol is distilled off until a temperature of 250° F. is attained, at which point the heat is shut off. The mixture is cooled and thinned with xylene to a 50 percent concentration, at which point the solvent system comprises about equal parts of butanol and xylene and the Gardner-Holdt viscosity is about X. The acid value is approximately 0.5. The resultant resin solution contains adequate

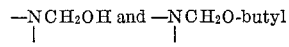

groups to cross link a hydroxyl containing resin.

To 12.0 g. of the butylated urea-formaldehyde resin solution prepared as described above there are added 12.0 g. of the solution of acrylic interpolymer described in Example 1 and 6.0 g. of a solution comprising 53% of xylene and 47% of a thermoplastic resin obtained by copolymerizing a monomer mixture comprising 50% methyl methacrylate, 40% 2-ethylhexyl acrylate and 10% dibutyl fumarate. The composition is thoroughly admixed and coated onto plain metal panels. The coated panels are flash dried for ½ hr., baked at 325° F. for ½ hr., cooled immersed in xylene for 2 minutes and dried. The films on the panels are white and opaque and are not soluble in xylene.

EXAMPLE 4

A composition is prepared comprising a mixture of 9.0 g. of a solution of butylated melamine-formaldehyde resin prepared as described in Example 1, 10.5 g. of a solution of a carboxylic acid amide interpolymer, said interpolymer comprising a copolymer of 20% N-butoxymethylacrylamide, 2% acrylic acid and 78% styrene (50% solids in a solvent mixture comprising 23% xylene, 11% butanol and 66% Solvesso 150), and 10.5 g. of a solution of a thermoplastic resin prepared as described in Example 1. The composition is coated onto steel panels and the panels are baked at 325° F. for 30 minutes, cooled, immersed in xylene for 2 minutes and dried. Opaque, white films are obtained.

EXAMPLE 5

A mixture is prepared comprising 9.0 g. of a butylated melamine resin solution and 10.5 g. of a thermoplastic resin solution, both prepared as described in Example 1, and 10.5 g. of a solution of a carboxylic acid amide interpolymer, comprising 10% acrylamide, 2.5% methacrylic acid and 87.5% styrene (50% solids in a solvent mixture comprising xylene and butanol). Films of the composition are cast on steel panels and the panels are baked at 325° F. for 30 minutes. After cooling, the panels are immersed in xylene for 2 minutes and then dried. The resultant films are white and opaque.

EXAMPLE 6

A nonoxidizable oil modified alkyd resin is prepared by esterifying a mixture comprising 35% coconut oil, 39.8% phthalic anhydride and 2% p-tert.-butylbenzoic acid, the remainder being trimethylol ethane. A mixture is prepared comprising 9.75 g. of a solution of this alkyd (65% solids in xylene), 10.5 g. of a solution of a butylated melamine-formaldehyde resin and 9.75 g. of a solution of a thermoplastic resin, both prepared as described in Example 1. Films of this mixture are coated onto steel panels and the panels are baked at 325° F. for 30 minutes. After cooling, immersion in xylene for 2 minutes and drying, white, opaque films are obtained.

EXAMPLES 7–16

In these examples, mixtures of polymer solutions having the compositions described in Table 1 are prepared. Films of each mixture are cast on steel panels, the panels are baked for 30 minutes, cooled, immersed in xylene for 2 minutes and dried. In each example, white opaque films are obtained. In Table 1, the polymer solutions are referred to by the designations set forth in the following chart.

| Polymer solution: | Corresponding designation |
|---|---|
| Butylated melamine-formaldehyde resin solution prepared as described in Example 1 | P-1 |
| Alkyd resin solution prepared as described in Example 6 | P-2 |
| Alkyd resin comprising 28.8% coconut oil, 3% tall oil fatty acid, 42.3% phthalic anhydride, the remainder being trimethylol ethane (65% solids in xylene) | P-3 |
| Thermoplastic acrylate copolymer solution prepared as described in Example 1 | P-4 |
| Thermoplastic acrylate copolymer comprising 10% dibutyl fumarate, 50% methyl methacrylate and 40% 2-ethylhexyl acrylate (50% solids in xylene) | P-5 |

TABLE 1

| Example | P-1 | P-2 | P-3 | P-4 | P-5 |
|---|---|---|---|---|---|
| 7 | 9.0 | 10.5 | | 10.5 | |
| 8 | 7.5 | 11.25 | | 11.25 | |
| 9 | 6.0 | 12.0 | | | 12.0 |
| 10 | 10.5 | 9.15 | | | 9.75 |
| 11 | 9.0 | 10.5 | | | 10.5 |
| 12 | 7.5 | 11.25 | | | 11.25 |
| 13 | 10.5 | | 9.75 | | 9.75 |
| 14 | 9.0 | | 10.5 | | 10.5 |
| 15 | 7.5 | | 11.25 | | 11.25 |
| 16 | 6.0 | | 12.0 | | 12.0 |

EXAMPLE 17

An automobile fender is two-toned by applying to one section of the fender a first composition comprising 100 g. of a butylated melamine-formaldehyde resin solution prepared as described in Example 1; 188 g. of a solution of an interpolymer comprising 30% styrene, 30% 2-ethylhexyl acrylate, 18% methyl methacrylate, 12% butyl methacrylate, 4% hydroxyethyl methacrylate, 4% hydroxypropyl methacrylate, and 2% methacrylic acid ¼ of which is reacted with ethylenimine (50% solids in a 90:10 xylene:butanol mixture); 124 g. of a thermoplastic copolymer comprising 50% methyl methacrylate, 30% 2-ethylhexyl acrylate and 20% dibutyl fumarate (44.5% solids in xylene); and 80 g. of xylene. Another section of the fender is coated with a second composition containing the same three polymer solutions which are present in the first composition described above (i.e., solutions of butylated melamine-formaldehyde resin, interpolymer and thermoplastic copolymer) in the respective amounts of 198 g., 330 g. and 246 g. The second composition also contains 123 g. of xylene and 78 g. of a phthalo blue dye composition. The fender is flash baked for 10 minutes at 180° F. and then baked at 350° F. for 30 minutes. It is then extracted by spraying it with xylene for about 10 minutes. The section of the fender coated with the first composition is white and the section coated with the second composition is blue. Both sections have good opacity and gloss.

EXAMPLE 18

A latex is prepared by admixing in 210 g. of water, 83 g. of butyl carbitol acetate, 420 g. of an aqueous emulsion of a copolymer comprising 50% methyl methacrylate, 48% 2-ethylhexyl acrylate and 2% methacrylic acid (50% solids), 420 g. of an aqueous emulsion of a copolymer comprising 60% methylmethacrylate, 38% butyl acrylate and 2% methacrylic acid (33.2% solids; average particle size 0.1 to 0.2 micron), and 85 g. of a thickener comprising 820 parts water, ½ part Dowicil 100, ½ part Nopco NDW antifoaming agent and 21 parts of hydroxy ethyl cellulose. This latex is sprayed onto a fender coated as described in Example 17 to act as a sealant for the coating. The fender is then baked for 20 minutes at 250° F. The sealer coating adheres well to the opaque undercoating. The sealed fender is then subjected to treatment with a commercial auto polish, with soapy water, with petroleum naphtha having a boiling point of 85° to 135° C., with xylene, with grease and with gasoline. The coating retained its opacity following treatment with each of these substances. However, by way of contrast, when an unsealed coating (i.e., a fender coated as described in Example 17 and not sealed as described in this example) is subjected to treatment with each of these substances, the coating at least temporarily loses its opacity in each instance.

EXAMPLE 19

A fender coated as described in Example 17 is coated to seal it by spraying with a dispersion of a resin in an organic liquid. The dispersion comprises 100 g. of a solution of a copolymer of 60% methyl methacrylate and 40% methyl acrylate (51% solids in Skellysolve C), 50 g. of high flash aromatic naphtha and 50 g. of aromatic petroleum having a boiling point of 150° to 170° C. The fender is baked for 15 minutes at 275° F. The resultant fender retains its opacity and is resistant to the effects of common solvents.

EXAMPLE 20

To a fender coated as described in Example 17 there is applied sufficient butanol to substantially fill the voids and cause the fender to lose its opacity. The fender is then top coated with a mixture of solution of butylated melamine-formaldehyde resin and acrylic interpolymer as described in Example 1. The fender is air dried for ½ hr. to cure the resin and to evaporate the butanol from the pores of the microporous film by diffusion through the top coat sealer. After baking, the original opacity of the film is restored. Subsequent treatment of the fender with butanol and other solvents fails to affect the opacity or color of the film.

EXAMPLE 21

This example illustrates some of the physical properties of the opaque, microporous films of this invention and compares the properties of the films both before and after extraction of the minute, discrete particles of the thermoplastic resin from the thermoset resin matrix.

A thermosetting resin composition is prepared by admixing 58 g. of a butylated melamine-formaldehyde resin solution of an interpolymer comprising 30% styrene, 30% 2-ethylhexyl acrylate, 18% methyl methacrylate, 12% butyl methacrylate, 4% hydroxyethyl methacrylate, 4% hydroxypropyl methacrylate, and 2% methacrylic acid ¼ of which is reacted with ethylenimine (50% solids in a 90:10 xylene:butanol mixture). To this mixture, there are added 70 g. of xylene and 62 g. of a solution of a thermoplastic interpolymer comprising 20% dibutyl fumarate, 50% methyl methacrylate and 30% 2-ethylhexyl acrylate (44.5% solids in xylene). The formulation is sprayed onto prime coated steel panels to a film thickness of 2 mils and the panels are baked for 30 minutes at 350° F. After cooling to room temperature, the panels are extracted for 5 minutes in xylene.

For purposes of contrast, the process described above is repeated omitting the thermoplastic resin—i.e., the panels are coated with a conventional thermosetting acrylic resin composition. Since the cured coatings do not contain any thermoplastic resin, the extraction step is omitted.

The extracted panels and the panels coated with a conventional thermosetting resin are evaluated as to their physical properties. The films of this invention are found to possess improved properties over the conventional thermoset resin films in every respect tested. Thus, in the mandrel bend test for flexibility, the extracted film evidenced no failure (i.e., no cracks in the bent area) while the conventional thermoset resin film showed 100% failure (i.e., one or more cracks running completely across the bent panel). The extracted film also possessed better chip resistance, better adhesion to the primer when cross hatched, improved humidity resistance and better impact resistance than the conventional thermoset resin film.

EXAMPLE 22

This example illustrates the extent to which the thermoplastic resin may be extracted from the thermoset resin matrix.

A formulation is prepared as described in Example 21 and is sprayed on a panel to a thickness of 1 mil. The panel is air dried for ½ hour, baked 30 minutes at 350° F. and immersed in xylene for 20 minutes. It is determined that 99.5% of the thermoplastic resin has been extracted from the film.

EXAMPLE 23

This example illustrates the resistance of a film of this invention to the collection of dirt.

An extracted panel prepared as described in Example 21 (i.e., coated with a microporous, opaque film) is placed outside on a rack along with a panel which has been coated with the conventional thermoset resin composition described in Example 21 (and containing 35% white pigment). The panel coated with the film of this invention does not become gray or lose opacity in contact with rain water; water does not collected on it in spots because it is completely and uniformly wetted with the water; and no dirt collects on in. By contrast, the rain water collects in spots on the pigmented film; and it collects and retains dirt after a rain to the degree that polishing with mild abrasive may be required to restore original color and luster.

Other compositions and films may be prepared employing the procedures set forth in the preceding examples and in the more general description set forth hereinabove without departing from the spirit and scope of this invention. Therefore, only such limitations should be imposed as are indicated in the appended claims.

We claim:
1. A method for producing a continuous, opaque film which comprises:
  (A) forming a homogeneous mixture under conditions avoiding substantial curing of a composition which does not readily separate into distinct phases of its component parts and which comprises (a) a thermosetting resin and (b) a solvent-extractable thermoplastic resin which does not enter into any substantial reaction with said thermosetting resin when said resin is cured, each of said resins being present in an amount such that upon casting of the composition as a film and curing of the thermosetting resin, at least a portion of the thermoplastic resin will form minute, discrete particles in the thermosetting resin matrix;
  (B) forming a film from said substantially uncured composition;
  (C) curing said thermosetting resin; and
  (D) extracting an amount of said thermoplastic resin from said thermosetting resin matrix with a solvent which does not dissolve the thermosetting resin, such that upon evaporation of said solvent from the film, a continuous, opaque, microporous film is obtained.

2. A method as defined in claim 1 wherein said thermosetting resin comprises an admixture of (1) an interpolymer of a hydroxyl ester of an ethylenically unsaturated acid with at least one other polymerizable ethylenically unsaturated monomer and (2) a cross linking agent therefor.

3. A method as defined in claim 2 wherein said cross linking agent is an aminoplast resin.

4. A method as defined in claim 1 wherein said thermosetting resin comprises a mixture of (1) an alkyd resin and (2) an aminoplast resin.

5. A method as defined in claim 4 wherein said alkyd resin is a non-oxidizable, oil modified alkyd resin.

6. A method as defined in claim 1 wherein said thermosetting resin comprises an aldehyde-modified interpolymer of an ethylenically unsaturated carboxylic acid amide with at least one other polymerizable ethylenically unsaturated monomer.

7. A method as defined in claim 1 wherein said thermoplastic resin comprises a polymer of an alkyl ester of acrylic or methacrylic acid.

8. A method as defined in claim 1 wherein said composition is prepared by admixing said thermoplastic resin and said thermosetting resin in a volatile organic solvent for said resins.

9. A method as defined in claim 1 wherein said opaque film is sealed by applying to the surface thereof a dispersion of resin particles, said resin particles being larger than the micropores in said film, and coalescing said particles to form a sealant coating on said film.

10. A method as defined in claim 1 wherein said opaque film is subsequently sealed by a process which comprises filling the voids in the film with a volatile solvent, applying a clear, protective sealer coating to said film and thereafter evaporating said solvent from said pores.

11. A method as defined in claim 1 wherein said substantially uncured composition is applied to a substrate.

12. A method as defined in claim 3 wherein said substantially uncured composition is applied to a substrate.

13. A method as defined in claim 4 wherein said substantially uncured composition is applied to a substrate.

14. A method as defined in claim 6 wherein said substantially uncured composition is applied to a substrate.

15. A method as defined in claim 7 wherein said substantially uncured composition is applied to a substrate.

16. A film obtained by the method of claim 1 wherein the amount of thermoplastic extracted from said thermosetting resin matrix is less than the total amount of thermoplastic originally in said matrix.

17. A film obtained by the method of claim 2 wherein the amount of thermoplastic extracted from said thermosetting resin matrix is less than the total amount of thermoplastic in said matrix.

18. A film obtained by the method of claim 6 wherein the amount of thermoplastic extracted from said thermosetting resin matrix is less than the total amount of thermoplastic originally in said matrix.

19. A film obtained by the method of claim 9 wherein the amount of thermoplastic extracted from said thermosetting resin matrix is less than the total amount of thermoplastic originally in said matrix.

20. A film obtained by the method of claim 10 wherein the amount of thermoplastic extracted from said thermosetting resin matrix is less than the total amount of thermoplastic originally in said matrix.

21. An article obtained by the method of claim 11 wherein the amount of thermoplastic extracted from said thermosetting resin matrix is less than the total amount of thermoplastic originally in said matrix.

22. An article obtained by the method of claim 12 wherein the amount of thermoplastic extracted from said thermosetting resin matrix is less than the total amount of thermoplastic originally in said matrix.

23. An article obtained by the method of claim 13 wherein the amount of thermoplastic extracted from said thermosetting resin matrix is less than the total amount of thermoplastic originally in said matrix.

24. An article obtained by the method of claim 14 wherein the amount of thermoplastic extracted from said thermosetting resin matrix is less than the total amount of thermoplastic originally in said matrix.

25. An article obtained by the method of claim 15 wherein the amount of thermoplastic extracted from said thermosetting resin matrix is less than the total amount of thermoplastic originally in said matrix.

26. A method according to claim 1 wherein an additive selected from the group consisting of pigments, dyes or mixtures thereof are incorporated therein.

27. A film obtained by the method of claim 26 wherein the amount of thermoplastic extracted from said thermosetting resin matrix is less than the total amount of thermoplastic originally in said matrix.

References Cited

UNITED STATES PATENTS

| | | | |
|---|---|---|---|
| 2,353,877 | 7/1944 | Chollar | 260—2.5 |
| 2,700,694 | 1/1955 | Fernald | 260—2.5 |
| 3,062,760 | 11/1962 | Dermody et al. | 260—2.5 |
| 3,310,505 | 3/1967 | Parker | 260—2.5 |
| 2,681,897 | 6/1954 | Frazier et al. | 260—850 |
| 2,794,010 | 5/1957 | Jackson | 117—135.5 XR |
| 2,853,459 | 9/1958 | Christenson et al. | 260—850 XR |
| 3,020,597 | 2/1962 | Smith-Johannsen | 260—2.5 M |
| 3,037,963 | 6/1962 | Christenson | 260—850 XR |
| 3,082,184 | 3/1963 | Folgiatore et al. | 260—851 XR |
| 3,108,089 | 10/1963 | Ferstandig | 260—850 |
| 3,183,282 | 5/1965 | Hurwitz | 260—851 XR |
| 3,230,275 | 1/1966 | Sckmakas | 260—850 XR |
| 3,271,479 | 9/1966 | Vogel et al. | 260—851 XR |

MURRAY TILLMAN, Primary Examiner

M. FOELAK, Assistant Examiner

U.S. Cl. X.R.

260—21, 23, 33.6, 39, 40, 41, 41.5, 78.5, 80.73, 80.81, 834, 851, 855, 901